(12) United States Patent
Chang (10) Patent No.: US 12,128,527 B2
(45) Date of Patent: Oct. 29, 2024

(54) VISE QUICK-CHANGE BASE WITH IMPROVED STRUCTURE

(71) Applicant: Chun-Wei Chang, New Taipei (TW)

(72) Inventor: Chun-Wei Chang, New Taipei (TW)

(*) Notice: Subject to any disclaimer, the term of this patent is extended or adjusted under 35 U.S.C. 154(b) by 294 days.

(21) Appl. No.: 17/933,486

(22) Filed: Sep. 20, 2022

(65) Prior Publication Data

US 2024/0091910 A1  Mar. 21, 2024

(51) Int. Cl.
*B25B 1/24* (2006.01)
*B23Q 1/00* (2006.01)
*B25B 1/10* (2006.01)
*B25B 5/00* (2006.01)

(52) U.S. Cl.
CPC .......... *B25B 1/2484* (2013.01); *B23Q 1/0072* (2013.01); *B25B 1/103* (2013.01); *B25B 5/006* (2013.01)

(58) Field of Classification Search
CPC ...... B23Q 1/0072; B23Q 3/066; B23Q 3/102; B23Q 3/103; B23Q 3/107; B23Q 3/108; B25B 5/006; Y10T 279/17136; Y10T 279/17162
See application file for complete search history.

(56) References Cited

U.S. PATENT DOCUMENTS 9,902,033 B1 * 2/2018 Taylor .................. B23Q 1/0072

* cited by examiner

*Primary Examiner* — Tyrone V Hall, Jr.

(57) ABSTRACT

A quick-change vice base with improved structure, which comprises: a base body, a quick-change coupler, a moveable block set and a central bolt, wherein, the bottoms of the first moveable block and second moveable block are respectively locked with a moveable block positioning base, one end of the moveable block positioning base has a pushing block; when the lead screw rotates clockwise, the first moveable block and the second moveable block will move toward the quick-change coupler, so that the curved stopping blocks on the first moveable block and the second moveable block will be fitted into the recesses of the quick-change coupler; when the lead screw rotates anticlockwise, the first movable block and the second movable block will move away from the quick-change coupler and drive the moveable block positioning seat to move simultaneously.

6 Claims, 8 Drawing Sheets

VISE QUICK-CHANGE BASE WITH IMPROVED STRUCTURE

BACKGROUND OF INVENTION

1. Field of the Invention

The present invention relates generally to the technical field of vice, and more particularly to a vice quick change base with improved structure.

2. Description of Related Art

Nowadays, higher efficiency means higher profit. A machine that allows placement of more fixtures in the limited space of its workbench is certainly more efficient for production. On the other hand, apart from more fixtures, it is required that the fixtures can be changed quickly. If the replacement of one fixture takes a couple of minutes, it would take dozens of minutes to replace ten fixtures. It is obviously inefficient.

Figure 1:
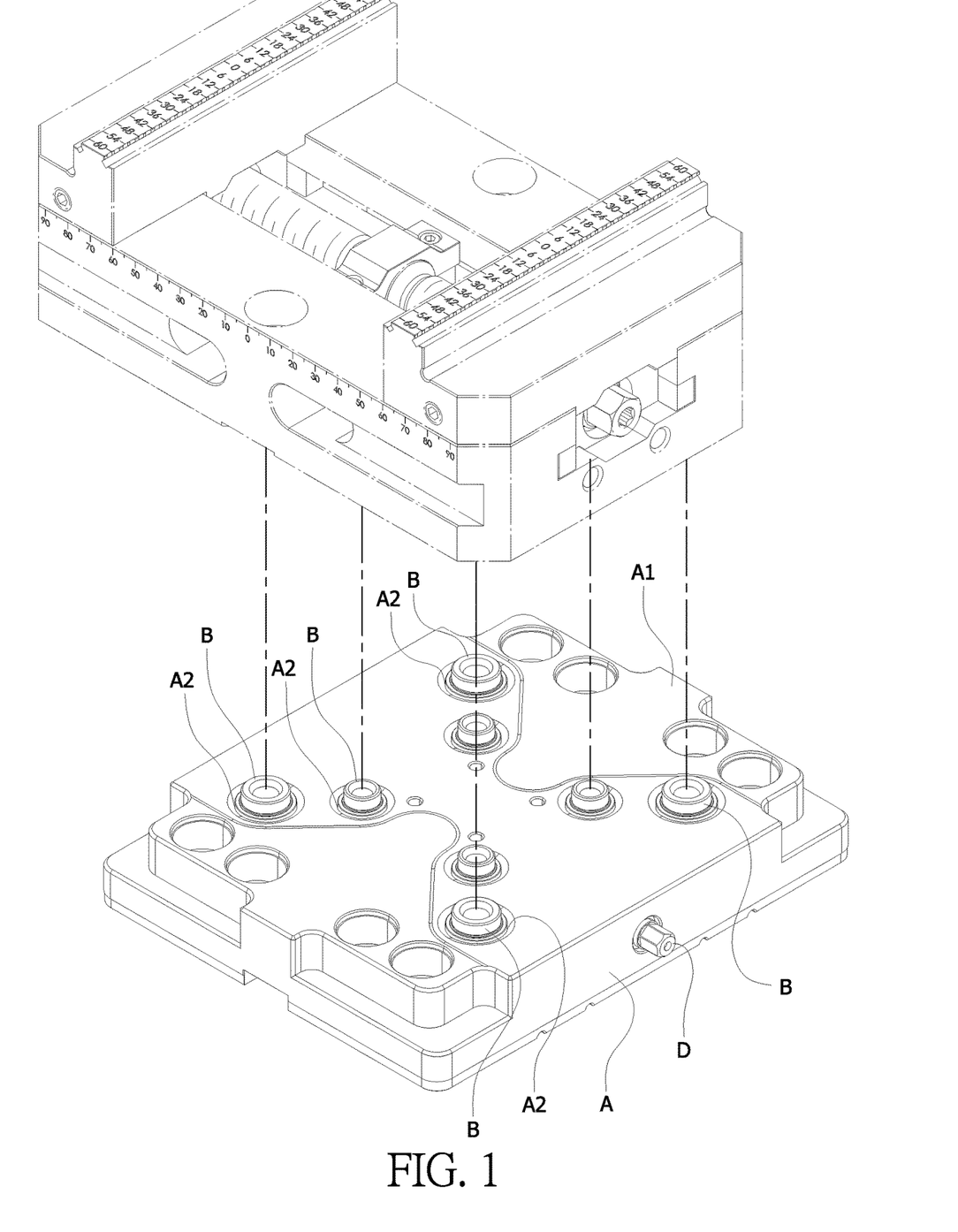
FIG. 1 is a perspective view of a conventional quick-release base.
Figure 2:
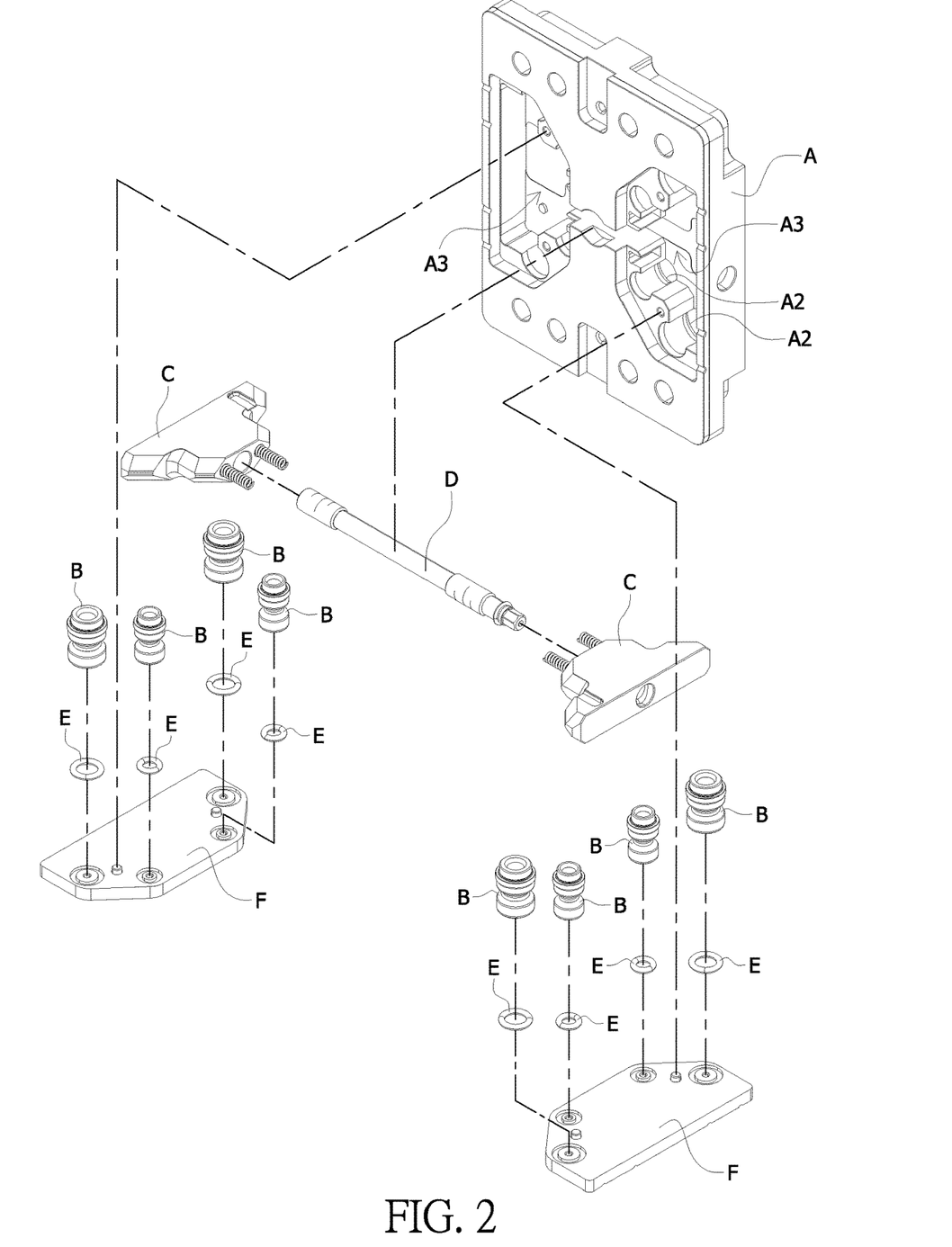
FIG. 2 is an exploded view of a conventional quick-release base.

Therefore, prior art has developed a quick-change vice base, as shown in FIG. 1 and FIG. 2, which comprises a die base (A), a plurality of quick couplers (B), two clamping devices (C), a guide bolt (D), a plurality of rubber rings (E) and a covering plate (F), wherein, the die base (A) has a joining surface (A1), the joining surface (A1) is configured with a plurality of quick coupler positioning holes (A2) for the quick couplers (B) to insert into and be positioned, the rubber ring (E) is fitted inside the quick coupler positioning hole (A2), one end of each quick coupler (B) is inserted into the corresponding quick coupler positioning hole (A2), the other end can be coupled with a vice [not disclosed in the drawing], the covering plate (F) is locked on the bottom of the die base (A), so that the die base (A) is formed with a holding space (A3), the holding space (A3) can hold clamping devices (C) symmetrically configured on the left and right sides and coupled by the guide bolt (D) going through them. Based on the different rotational directions of the guide bolt (D) on the left and right sides, the clamping device (C) is locked in a form that it will open or close along with the rotation of the guide bolt (D). Thus, when the guide bolt (D) is adjusted to move forward, the clamping device (C) will immediately fix the quick coupler (B), clamping the quick coupler (B) tightly inside the quick coupler positioning hole (A2). On the contrary, when the guide bolt (D) is withdrawn from the quick coupler (B), and the quick coupler (B) is pressed down and then released, the quick coupler (B) will be pushed upward by the elastic force of the rubber ring (E), thus pushing the quick coupler (B) out of the quick coupler positioning hole (A2) for quick replacement.

However, although the conventional quick-change vice base can allow quick change, during replacement, the quick coupler (B) must be pressed down, and repeated operations will cause elastic fatigue, deformation or even aging and deterioration of the rubber ring (E) inside the quick coupler positioning hole (A2) under the pressure of the quick coupler (B). As a result, it may become difficult to take the quick coupler (B) out of the quick coupler positioning hole (A2), and the replacement will become very inconvenient and take considerable time and effort. Therefore, an improvement is necessary.

In view of the above problem found in the conventional quick-change vice base, the inventor attempted to improve the design of the quick-change vice base for quick replacement of the vices, in which rubber rings are not used to push the coupler out of the hole.

SUMMARY OF THE INVENTION

The purpose of the present invention is to provide an improved structure of the vise quick-change base, thereby improving the elastic fatigue and deformation of the rubber gasket when the vise quick-change base is replaced for a long time, which affects the replacement time and thus reduce productivity.

In order to solve the above problems and achieve the purpose of the present invention, the technical means of the present invention are realized in this way, which is a vise quick-change base with improved structure, which comprises: a base body a first holding groove disposed in a center of the base body, two second holding grooves disposed at both ends of the first holding groove and communicating with the first holding groove, a plurality of quick-change coupler positioning holes respectively disposed in the two second holding grooves and penetrating the base body;

a plurality of quick-change couplers correspondingly disposed in the plurality of the quick-change coupler positioning holes, one end of the plurality of quick-change couplers inserted in the quick-change coupler positioning holes and the other end can be coupled with a vice, and each quick-change coupler has a recess;

a movable block set correspondingly disposed in the two second holding grooves and including a first movable block and a second movable block, the movable block set can move toward or away from each other in the two second holding grooves, the first movable block and the second movable block respectively having a through hole in the direction of the first holding groove and a cross-hole nut arranged in the vertical direction of the through hole: and a lead screw disposed in the first holding groove and penetrating the through hole and screwed into the cross-hole nut;

wherein the bottoms of the first movable block and the second movable block are respectively locked with a movable block positioning seat, and the movable block positioning seat includes a plurality of extension positioning pieces corresponding to the bottom of the plurality of quick-change couplers, and one end of the extension positioning piece has a pushing block toward the quick-change coupler positioning hole, the first movable block and the second movable block corresponding to the recess of the quick-change coupler respectively has arc-shaped block that can be engaged with the recess;

when the lead screw rotates clockwise, the first movable block and the second movable block will move toward the quick-change coupler, so that the arc-shaped blocks on the first movable block and the second moveable block are fitted into the recesses on the quick-change coupler, thereby clamping the quick-change coupler tightly inside the quick-change coupler positioning hole; on the contrary, when the lead screw rotates anticlockwise, the first movable block and the second movable block will move away from the quick-change coupler and drive the moveable block positioning seat to move simultaneously, so that the protruding pushing block on the moveable block positioning seat will push the bottom of the quick-change coupler and push the quick-change coupler out of the quick-change coupler positioning hole.

More preferably, wherein the pushing block also has a guide surface, the guide surface can be an inclined surface or curved surface, used to guide the quick-change coupler, so that the quick-change coupler can be pushed out of the quick-change coupler positioning hole or into the quick-change coupler positioning hole along the guide surface.

More preferably, wherein the first moveable block and second movable block are in a trapezoidal form with the longer side facing outward and the short side facing inward, the two sloping sides are respectively protruded with an outward curved stopping block and an inward curved stopping block separated by a stage part.

More preferably, wherein, at the position corresponding to the extended positioning plate part, the space inside the second holding groove is separated to from a position limiting space to limit the movement of the extended positioning plate part, and the position limiting space is communicated with the second holding groove.

More preferably, wherein, at the position corresponding to the second holding groove, the base body is configured with a cover to close the second holding groove.

More preferably, wherein the base body is configured with a plurality of mounting holes for the base body to be fixed on the machine workbench.

Comparing with the prior art, the present invention has the following functions and benefits:

When the lead screw is rotated to become loose, and the moveable block set withdraws from the quick-change coupler, the pushing block will simultaneously push the bottom end of the quick-change coupler, so as to push the quick-change coupler out of the quick-change coupler positioning hole. In this way, the operator can quickly replace the vices. The present invention enables quick replacement without the use of rubber rings.

DETAILED DESCRIPTION OF THE INVENTION

Figure 3:
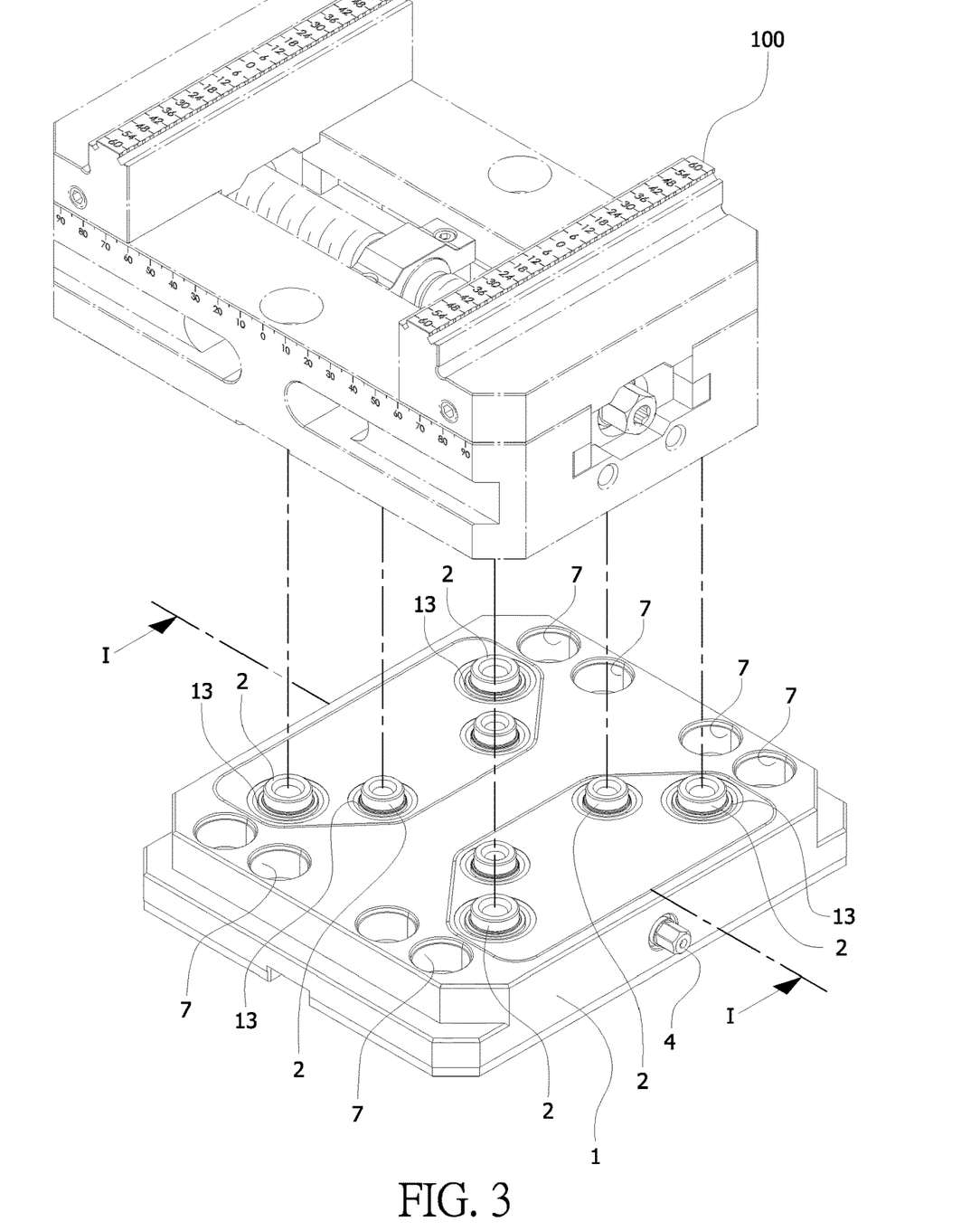
FIG. 3 is a perspective view of the present invention implemented to match a pair of vices.
Figure 4:
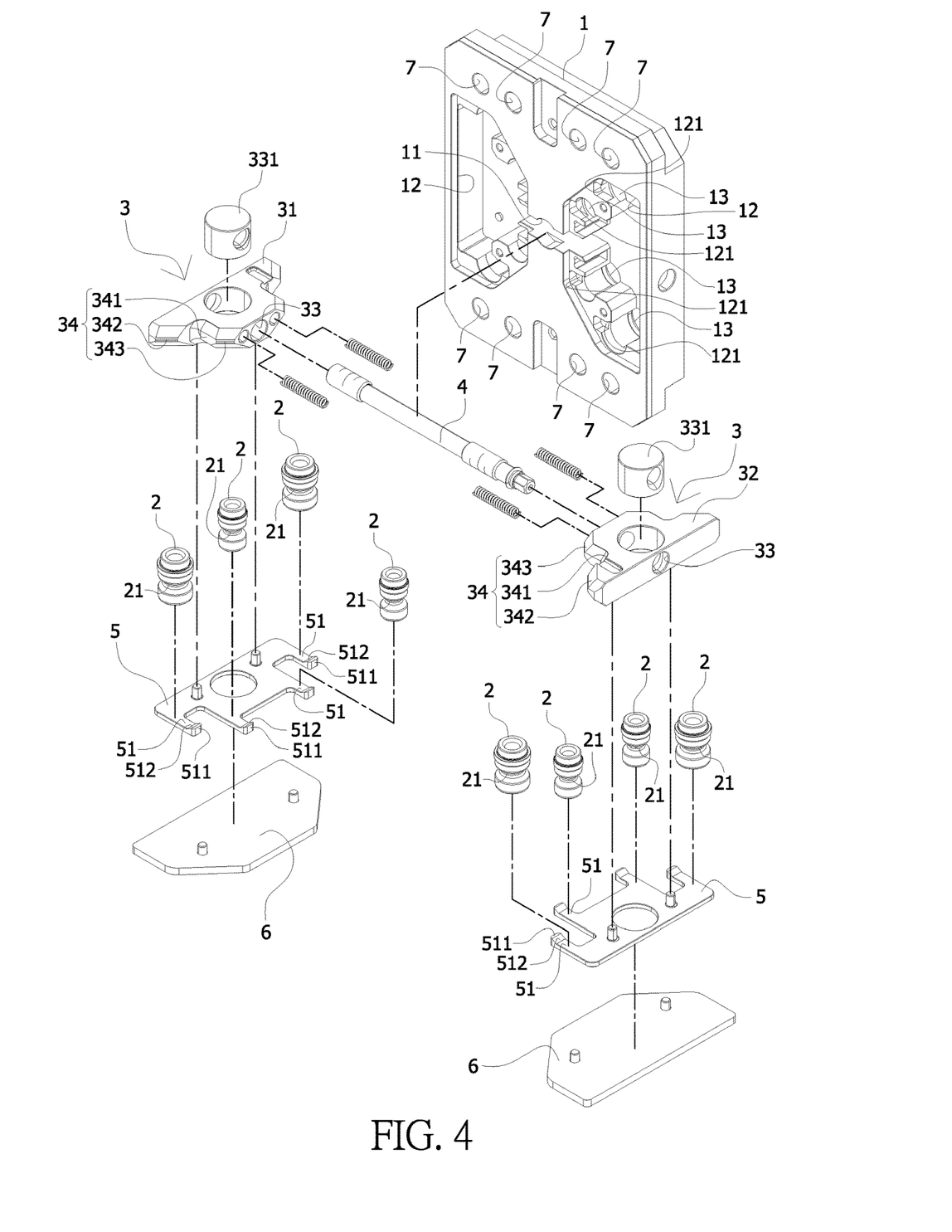
FIG. 4 is an exploded view of the present invention.

Depicted in FIG. 3 and FIG. 4 is a vice quick change base with improved structure, comprising: a base body (1), with the center of its bottom configured with a first holding groove (11), wherein, the two ends of the first holding groove (11) are respectively configured with a second holding groove (12) joint and communicated with the first holding groove (11), the inside of the second holding groove (12) is configured with a plurality of quick-change coupler positioning hole (13) going vertically through the base body (1); a plurality of quick-change couplers (2), configured to match the quick-change coupler positioning hole (13), with its one end inserted into the quick-change coupler positioning hole (13), and the other end used for coupling with a vice, the quick-change coupler (2) having a recess (21); a moveable block set (3), made up of a first moveable block (31) and a second moveable block (32) configured to respectively match the second holding groove (12) and capable of moving toward or away from each other along the second holding groove (12), wherein, the sides of the first moveable block (31) and the second moveable block (32) facing the first holding groove (11) are respectively configured with a through hole (33), and a cross-hole nut (331) is configured in the direction perpendicular to the through hole (33); and a lead screw (4), configured inside the first holding groove (11), going through the through hole (33) and screwed into the cross-hole nut (331); characterized in that: the bottoms of the first moveable block (31) and the second moveable block (32) are respectively configured with a moveable block positioning base (5), the side of the moveable block positioning base (5) facing the quick-change coupler (2) is protruded with an extended positioning plate part (51) configured to match the quick-change coupler (2), one end of the extended positioning plate part (51) is protruded with a pushing block (511) in the direction facing the quick-change coupler positioning hole (13). Furthermore, the first moveable block (31) and the second moveable block (32) respectively have a curved stopping block (34) to fit into the recess (21) at the position corresponding to the recess (21) of the quick-change coupler (2).

In the structure described above, the inside of the second holding groove (12) is separated to form a position limiting space (121) at the position corresponding to the extended positioning plate part (51). The position limiting space (121) is communicated with the second holding groove (12), so that the position limiting space (121) can hold the extended positioning plate part (51) and limit its movement.

In the structure described above, at the position corresponding to the second holding groove (12), the base body (1) is further configured with a cover (6) to close the second holding groove (12).

Through locking and fixation of the cover (6), the components such as the moveable block set (3) and the moveable block positioning base (5) can be locked and mounted inside the base body (1). Meanwhile, the cover (6) can prevent dust or contaminants from entering the second holding groove (12).

In the structure described above, the base body (1) is further configured with a plurality of mounting holes (7), for the base body (I) to be fixed on the machine workbench.

Figure 5:
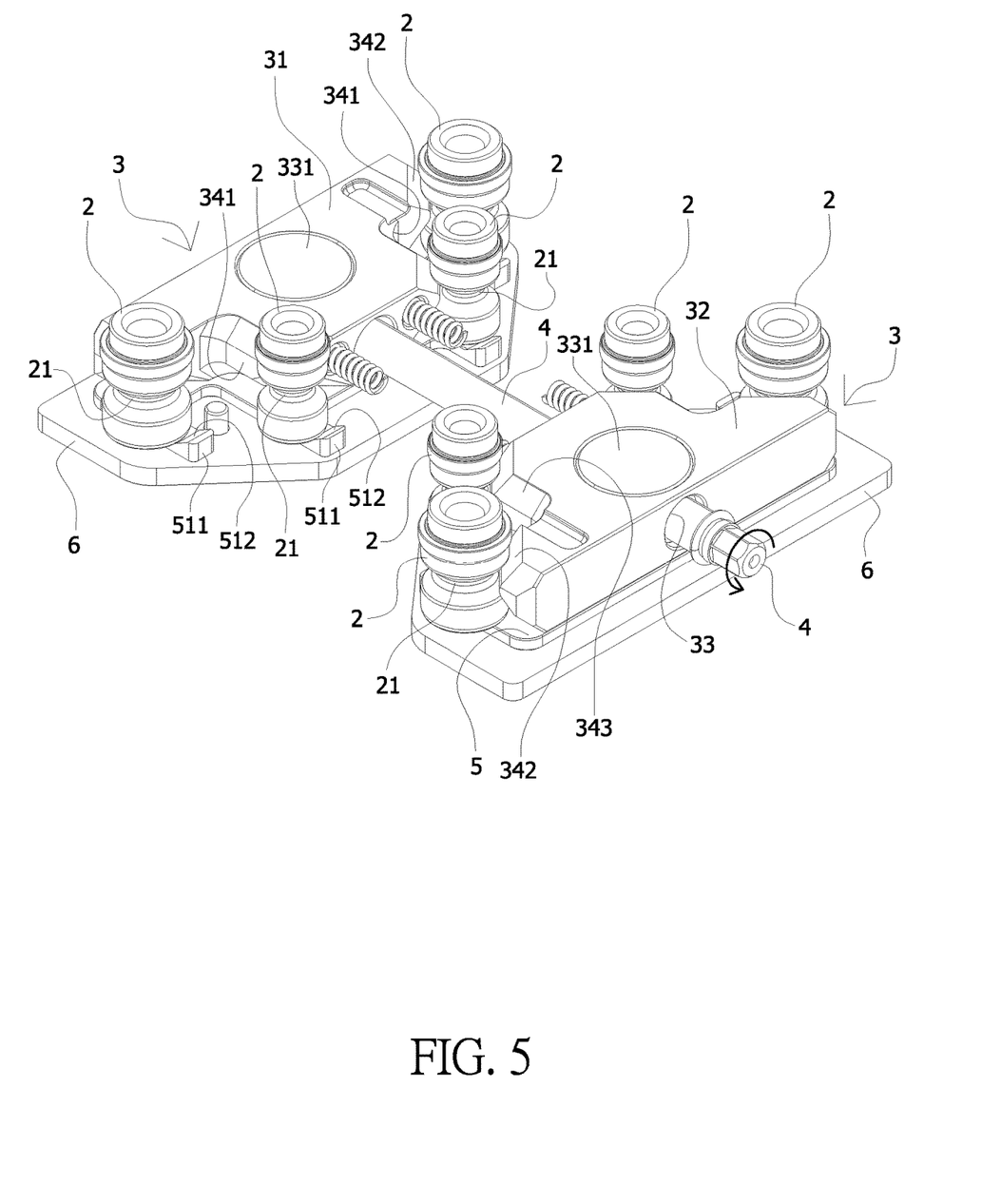
FIG. 5 and FIG. 6 are implementation views showing the operation of the moveable block set and a lead screw of the present invention.
Figure 6:
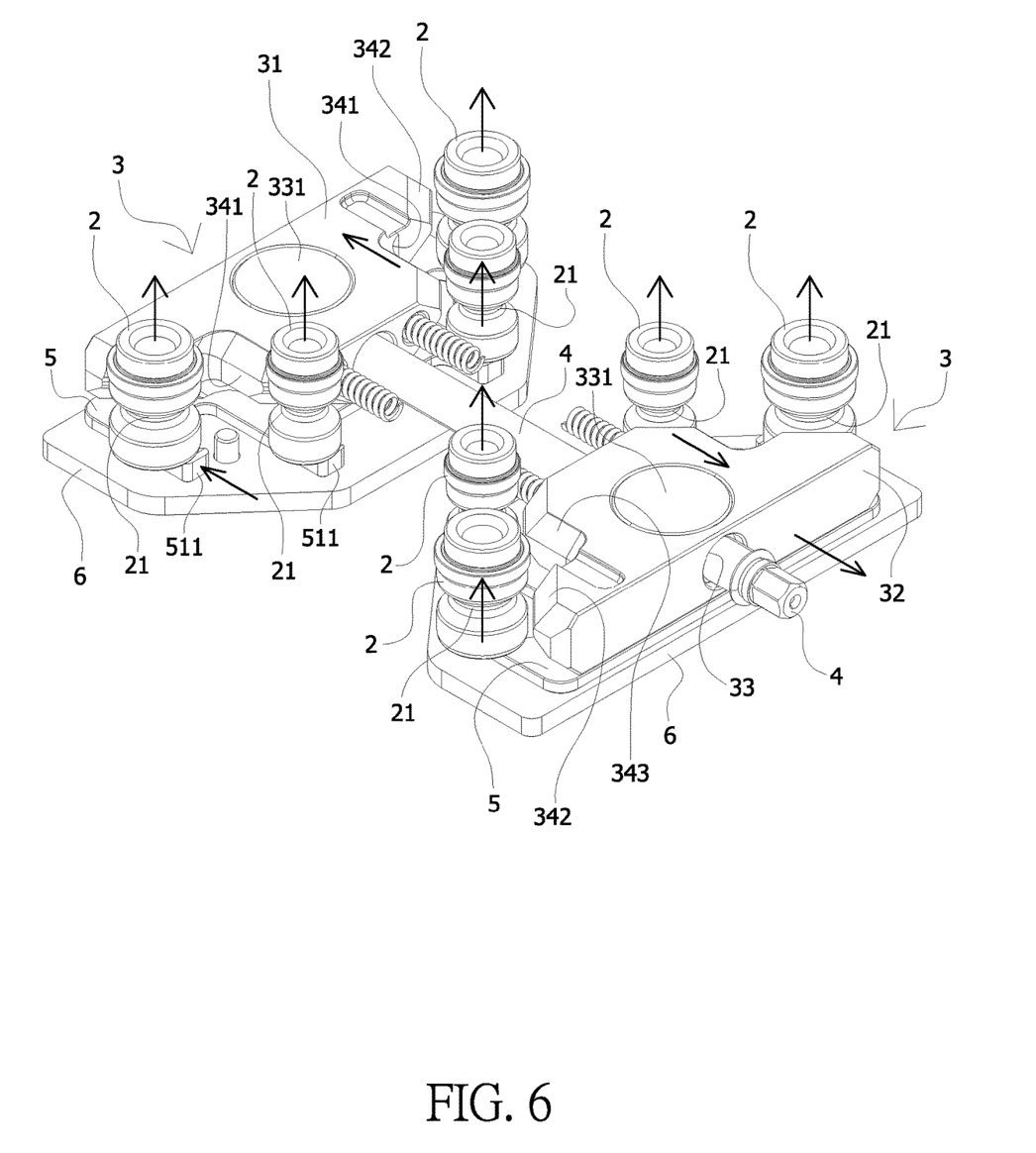
Figure 7:
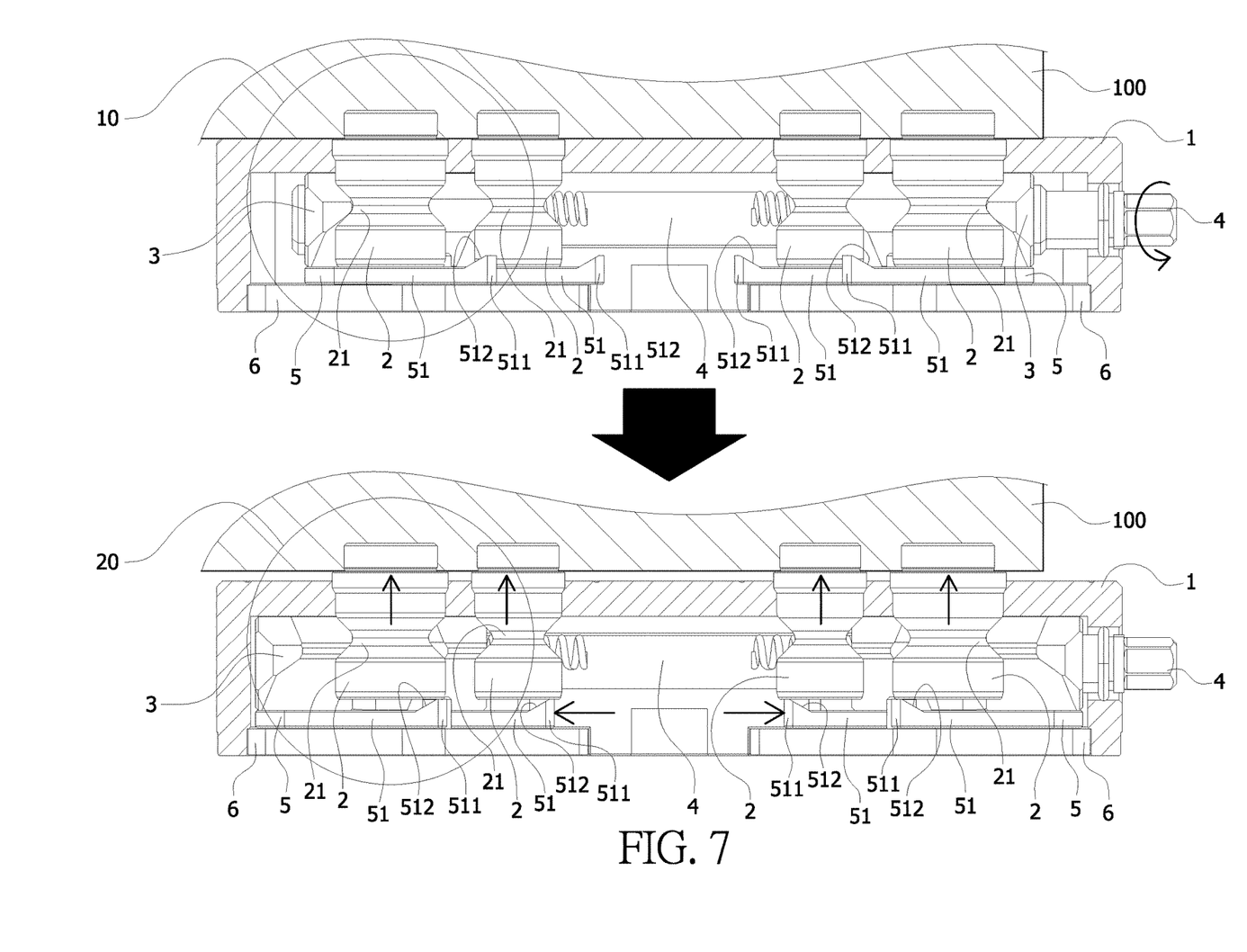
FIG. 7 is an I-I sectional view of FIG. 3 showing the operation.

Referring to FIG. 5 to FIG. 7, the bottom end of the quick-change coupler (2) abuts the extended positioning plate part (51). When the lead screw (4) rotates clockwise, the first moveable block (31) and the second moveable block (32) will move toward the quick-change coupler (2), so that the curved stopping block (34) on the first moveable block (31) and the second moveable block (32) will fit into the recess (21) on the quick-change coupler (2), thus clamping the quick-change coupler (2) tightly inside the quick-change coupler positioning hole (13); On the contrary, when the lead screw (4) rotates anticlockwise, the first moveable block (31) and the second moveable block (32) will move away from the quick-change coupler (2), driving the moveable block positioning base (5) to move simultaneously. As a result, the pushing block (511) protruding out of the moveable block positioning base (5) will push the bottom end of the quick-change coupler (2), thus pushing the quick-change coupler (2) out of the quick-change coupler positioning hole (13). Now, the operator can quickly remove and replace the vices. The quick-change function is thus realized.

As disclosed in FIG. 5 and FIG. 6, the first moveable block (31) and the second moveable block (32) are in a trapezoidal shape, with its long side facing outward and its short side facing inward. Its two sloping sides are protruded with an outward curved stopping block (342) and an inward curved stopping block (343) separated by, a stage part (341).

In the structure described above, when rotating the lead screw (4) to move the first moveable block (31) and the second moveable block (32) toward the quick-change coupler (2), the conic sloping edges of the outward curved stopping block (342) and the inward curved stopping block (343) will be directly inserted into the recess (21) of the quick-change coupler (2), and push the quick-change coupler (2) to be locked. In this way, the vices (100) can be tightly positioned and mounted, ensuring stability and safety of the vices (100).

Figure 8:
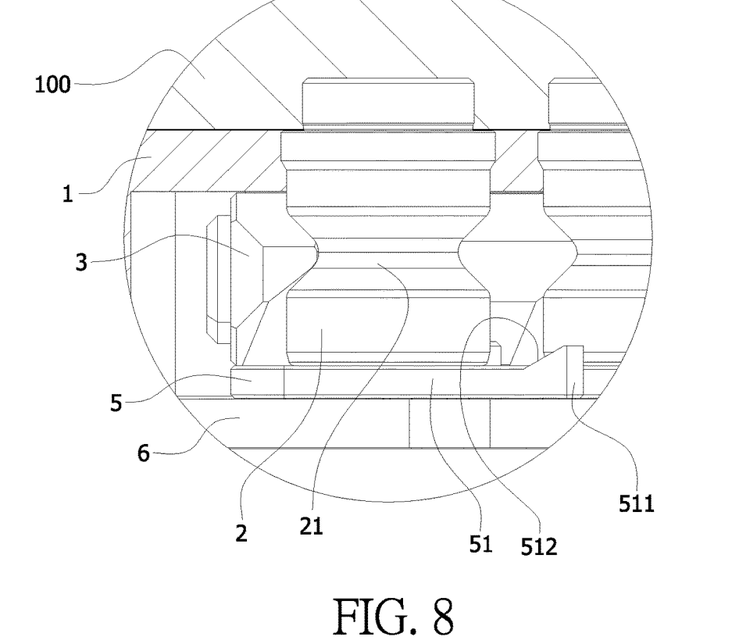
FIG. 8 is a partially enlarged view of Part 10 in FIG. 7.
Figure 9:
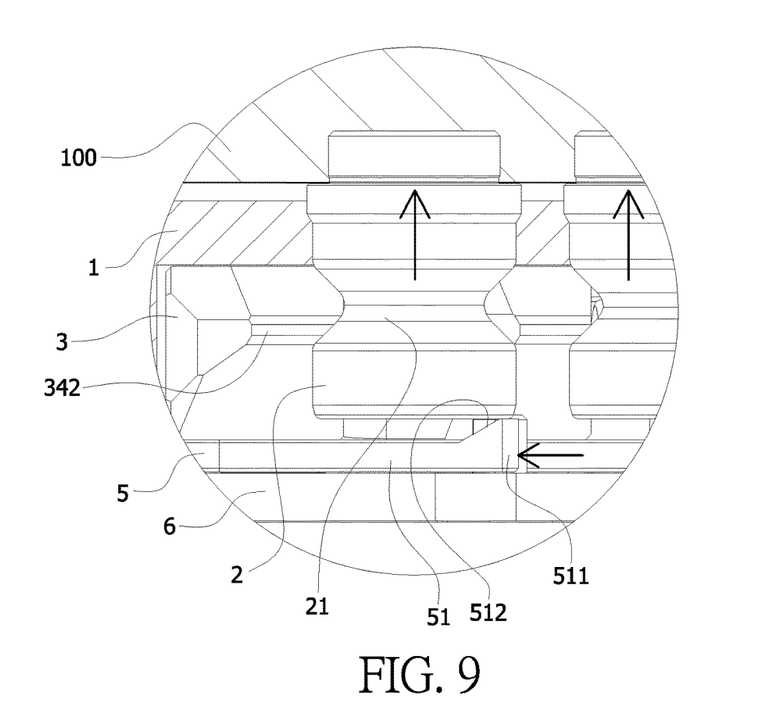
FIG. 9 is a partially enlarged view of Part 20 in FIG. 7.

Referring to FIG. 7 to FIG. 9, the pushing block (511) also has a guide surface (512). The guide surface (512) can be an inclined surface or curved surface [not disclosed in the drawing]. Thus, when the pushing block (511) pushes the bottom end of the quick-change coupler (2), the guide surface (512) will guide the quick-change coupler (2), so that the quick-change coupler (2) will be pushed out along the guide surface (512). On the contrary, when the pushing block (511) moves away from the quick-change coupler (2), the quick-change coupler (2) can enter the base body (I) along the guide surface (512). In this way, the voices can be easily assembled and replaced. The whole operation becomes more convenient.

I claim:

1. A vice quick change base with improved structure, comprising
    a base body (1), a first holding groove (11) disposed in a center of the base body (1), two second holding grooves (12) disposed at both ends of the first holding groove (11) and communicating with the first holding groove (12), a plurality of quick-change coupler positioning holes (13) respectively disposed in the two second holding grooves (12) and penetrating the base body (1);
    a plurality of quick-change couplers (2) correspondingly disposed in the plurality of the quick-change coupler positioning holes (13), one end of the plurality of quick-change couplers (2) inserted in the quick-change coupler positioning holes (13) and the other end can be coupled with a vice, and each quick-change coupler (2) has a recess (21);
    a movable block set (3) correspondingly disposed in the two second holding grooves (12) and including a first movable block (31) and a second movable block (32), the movable block set (3) can move toward or away from each other in the two second holding grooves (12), the first movable block (31) and the second movable block (32) respectively having a through hole (33) in the direction of the first holding groove (11) and a cross-hole nut (331) arranged in the vertical direction of the through hole (33); and
    a lead screw (4) disposed in the first holding groove (11) and penetrating the through hole (33) and screwed into the cross-hole nut (331);
    wherein the bottoms of the first movable block (31) and the second movable block (32) are respectively locked with a movable block positioning seat (5), and the movable block positioning seat (5) includes a plurality of extension positioning pieces (51) corresponding to the bottom of the plurality of quick-change couplers (2), and one end of the extension positioning piece (51) has a pushing block (511) toward the quick-change coupler positioning hole (13), the first movable block (31) and the second movable block (32) corresponding to the recess (21) of the quick-change coupler (2) respectively has arc-shaped block (34) that can be engaged with the recess (21);
    when the lead screw (4) rotates clockwise, the first movable block (31) and the second movable block (32) will move toward the quick-change coupler (2), so that the arc-shaped blocks (34) on the first movable block (31) and the second flexible block (32) are fitted into the recesses (21) on the quick-change coupler (2), thereby clamping the quick-change coupler (2) tightly inside the quick-change coupler positioning hole (13); on the contrary, when the lead screw (4) rotates anti-clockwise, the first movable block (31) and the second movable block (32) will move away from the quick-change coupler (2) and drive the moveable block positioning seat (5) to move simultaneously, so that the protruding pushing block (511) on the flexible block positioning seat (5) will push the bottom of the quick-change coupler (2) and push the quick-change coupler (2) out of the quick-change coupler positioning hole (13).

2. The vice quick change base with improved structure according to claim 1, wherein the pushing block (511) also has a guide surface (512), the guide surface (512) can be an inclined surface or curved surface, used to guide the quick-change coupler (2), so that the quick-change coupler (2) can be pushed out of the quick-change coupler positioning hole (13) or into the quick-change coupler positioning hole (13) along the guide surface (512).

3. The vice quick change base with improved structure according to claim 1, wherein the first flexible block (31) and second movable block (32) are in a trapezoidal form with the longer side facing outward and the short side facing inward, the two sloping sides are respectively protruded with an outward curved stopping block (342) and an inward curved stopping block (343) separated by a stage part (341).

4. The vice quick change base with improved structure according to claim 1, wherein, at the position corresponding to the extended positioning plate part (51), the space inside the second holding groove (12) is separated to from a position limiting space (121) to limit the movement of the extended positioning plate part (51), and the position limiting space (121) is communicated with the second holding groove (12).

5. The vice quick change base with improved structure according to claim 1, wherein, at the position corresponding to the second holding groove (12), the base body (1) is configured with a cover (6) to close the second holding groove (12).

6. The vice quick change base with improved structure according to claim 1, wherein the base body (1) is configured with a plurality of mounting holes (7) for the base body (1) to be fixed on the machine workbench.

* * * * *